(12) United States Patent
Brique et al.

(10) Patent No.: US 11,736,504 B2
(45) Date of Patent: *Aug. 22, 2023

(54) METHOD AND SYSTEM TO DETECT ABNORMAL MESSAGE TRANSACTIONS ON A NETWORK

(71) Applicant: NAGRAVISION S.A., Cheseaux-sur-Lausanne (CH)

(72) Inventors: Olivier Brique, Jongny (CH); Patrick Servet, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,426

(22) Filed: Jan. 29, 2021

(65) Prior Publication Data

US 2021/0152587 A1 May 20, 2021

Related U.S. Application Data

(63) Continuation of application No. 16/090,141, filed as application No. PCT/EP2017/058480 on Apr. 10, 2017, now Pat. No. 10,992,694.

(30) Foreign Application Priority Data

Apr. 19, 2016 (EP) .................................... 16165909

(51) Int. Cl.
*H04L 9/40* (2022.01)
*H04L 43/0852* (2022.01)
*H04L 41/142* (2022.01)
*H04L 43/106* (2022.01)
*H04L 43/04* (2022.01)

(52) U.S. Cl.
CPC ........ *H04L 63/1425* (2013.01); *H04L 41/142* (2013.01); *H04L 43/04* (2013.01);
(Continued)

(58) Field of Classification Search
CPC ............ H04L 63/1425; H04L 63/1408; H04L 41/142; H04L 43/04; H04L 63/1416;
(Continued)

(56) References Cited

U.S. PATENT DOCUMENTS 6,041,352 A 3/2000 Burdick et al.
2009/0126019 A1 5/2009 Memon et al.
(Continued)

OTHER PUBLICATIONS

International Search Report issued in PCT/EP2017/058480 dated May 18, 2017.
(Continued)

*Primary Examiner* — Mohammed Waliullah
(74) *Attorney, Agent, or Firm* — Oblon, McClelland, Maier & Neustadt, L.L.P.

(57) ABSTRACT

A surveillance system connectable to a network, comprising a communication module and a management module; said system being configured to, during an initialization phase: a. intercept a first message being sent to a first device; b. intercept a second message said second message being a response from the first device to the first message; c. calculate a time interval between the interception of the first message and the second message; d. repeat the steps a. to c. to determine further time intervals; e. determine a distribution of said time intervals; f. store the distribution and during a surveillance phase, intercept a third message said message being sent to the first device; intercept a fourth message said fourth message being a response to the third message; calculate a new time interval between the interception of the third and fourth messages; and verify that the new time interval is within the distribution.

8 Claims, 5 Drawing Sheets

(52) U.S. Cl.
CPC ........ *H04L 43/0852* (2013.01); *H04L 43/106* (2013.01); *H04L 63/1408* (2013.01); *H04L 63/1416* (2013.01); *H04L 63/30* (2013.01); *H04L 2463/121* (2013.01)

(58) Field of Classification Search
CPC ... H04L 63/30; H04L 43/0852; H04L 43/106; H04L 2463/121
See application file for complete search history.

(56) References Cited

U.S. PATENT DOCUMENTS

| | | | |
|---|---|---|---|
| 2010/0281539 A1* | 11/2010 | Burns | ................ H04L 63/1441 726/23 |
| 2012/0159267 A1 | 6/2012 | Gyorffy | |
| 2013/0346808 A1 | 12/2013 | Gyorffy | |
| 2014/0379908 A1 | 12/2014 | Gyorffy | |
| 2016/0234344 A1* | 8/2016 | Higuchi | ................ H04L 67/42 |
| 2016/0359592 A1* | 12/2016 | Kulshreshtha | ...... H04L 63/1408 |
| 2017/0026495 A1 | 1/2017 | Gyorffy | |

OTHER PUBLICATIONS

Written Opinion issued in PCT/EP2017/058480 dated May 18, 2017.
European Search Report issued in EP 16165909.9 dated Jun. 30, 2016.

\* cited by examiner

Table 1

| Start | Length | Control | Destination Address | Source Address | CRC | User Data | CRC | ... | User Data | CRC |
|---|---|---|---|---|---|---|---|---|---|---|
| 2 | 1 | 1 | 2 | 2 | 2 | 16 | 2 | | 1-16 | 2 |

|← Block 0 →|← Block 1 →| |← Block n →|

Fixed Length Header
10 bytes

Body
0 - 282 bytes

Maximum of n = 16 blocks
Maximum Data 280 bytes

Overall Message Size in Bytes:

Header      10
Body - Data    250
     - CRC     32
            ___
            292

Fig. 6

Table 2

| | 1 | | | | | | |
|---|---|---|---|---|---|---|---|
| DIR | PRM | FCB | FCV | | | | |
| | 0 | RES | DFC | FUNCTION CODE | | | |
| 7 | 6 | 5 | 4 | 3 | 2 | 1 | 0 |

Bit

Primary to Secondary Function Codes

| CODE | DESCRIPTION |
|---|---|
| 0 | Reset Link |
| 1 | Reset User Process |
| 2 | Test Link |
| 3 | User Data - Confirm Expected |
| 4 | User Data - No Confirm |
| 9 | Request Link Status |

Secondary to Primary Function Codes

| CODE | DESCRIPTION |
|---|---|
| 0 | Confirm - ACK |
| 1 | Confirm - NACK |
| 11 | Respond - Link Status |
| 14 | Link Not Functioning |
| 15 | Link Not Used |

Fig. 7

METHOD AND SYSTEM TO DETECT ABNORMAL MESSAGE TRANSACTIONS ON A NETWORK

CROSS REFERENCE TO RELATED APPLICATIONS

This application is a continuation of U.S. Ser. No. 16/090,141, filed Sep. 28, 2018, which is a U.S. National Stage Application of International Application No. PCT/EP2017/058480 filed Apr. 10, 2017, which claims priority from European Patent Application No. 16165909.9 filed Apr. 19, 2016.

INTRODUCTION

The present disclosure is in the field of surveillance system of a network, in particular of an industrial network connecting various devices in charge of collecting data or giving commands.

BACKGROUND ART

Protection against software attacks is a main concern in the industry and in particular in the case of a network of devices controlling or supervising a plant, a factory or a manufacture. In these cases, we have numerous devices collecting data and giving commands under the supervision of one or more servers.

The protocol used for the communication with these devices is usually basic without protection since it was not intended to by accessible outside the premises. The response for the security threat was made on the server, in particular to the connection of the server with the outside world.

New threat models have been demonstrated since, for example, the server/controller of a nuclear plant, communicating to the devices spread in the plant, is also connected to other networks having access to servers or computers outside the plant. Even if particular care has been taken to protect the inside network, a risk has been detected that a third party can access to the final devices and influence the tasks for which these devices have been designed. One can imagine if the device in charge of acquiring the temperature inside the kernel of a nuclear plant can be altered, the consequence could be huge.

One major problem to improve the security of these devices is the difficulty to upgrade the internal software (generally embedded software) and/or upgrade the communication protocol, designed sometimes more than 20 years ago.

BRIEF DESCRIPTION OF THE FIGURES

The present disclosure will be better understood thanks to the attached figures in which.

DETAILED DESCRIPTION

According to one embodiment of the disclosure, it is proposed a method to supervise a network connected to a first device, said method comprising, during an initialization phase:

a. intercepting a first message from the network, said message being sent to a first device, b. intercepting a second message from the network, said second message being a response from the first device to the first message, c. calculating a time interval between the interception of the first and the interception of the second message, d. repeating the steps a to c in order to determine further time intervals, e. determining a distribution of said time intervals, e. storing, in reference with the first device, the distribution of time intervals, and during a surveillance phase, said method comprising:

f. intercepting a third message from the network, said message being sent to the first device, g. intercepting a fourth message from the network, said fourth message being a response from the first device to the third message, h. calculating a time interval between the third and the fourth message, i. verifying that the new time interval is within the distribution of time intervals.

According to the main embodiment, the target device is not modified, only the traffic on the network connecting the target device is analyzed. This analysis is based on the response time of the target device, the response time being the time interval between an incoming message to the target device and an outgoing message from the target device.

The method according to the main embodiment of the disclosure is divided into two phases, a learning phase or initialization phase, and an operational phase.

During the learning phase, a management module in charge of the supervision of the network, records the response time of the devices. For that purpose, the management module have access to the network connected to the target and then can analyze the messages exchanged with this device.

During the learning phase, the management module records the response time or the time interval for a given target and compiles a distribution of time intervals. This distribution of time intervals is associated with a device or a device type. Preferably, the plurality of time intervals is measured in the same condition i.e. the information requested, i.e. the first message is of the same message type.

During the operational phase, the management module measures the time interval for a given target, i.e. the time interval between the incoming message and the outgoing message and compares the measured duration with the distribution of time intervals.

In case that the measured time interval is outside a range defined by the distribution of time intervals, an alarm is set.

Figure 1:
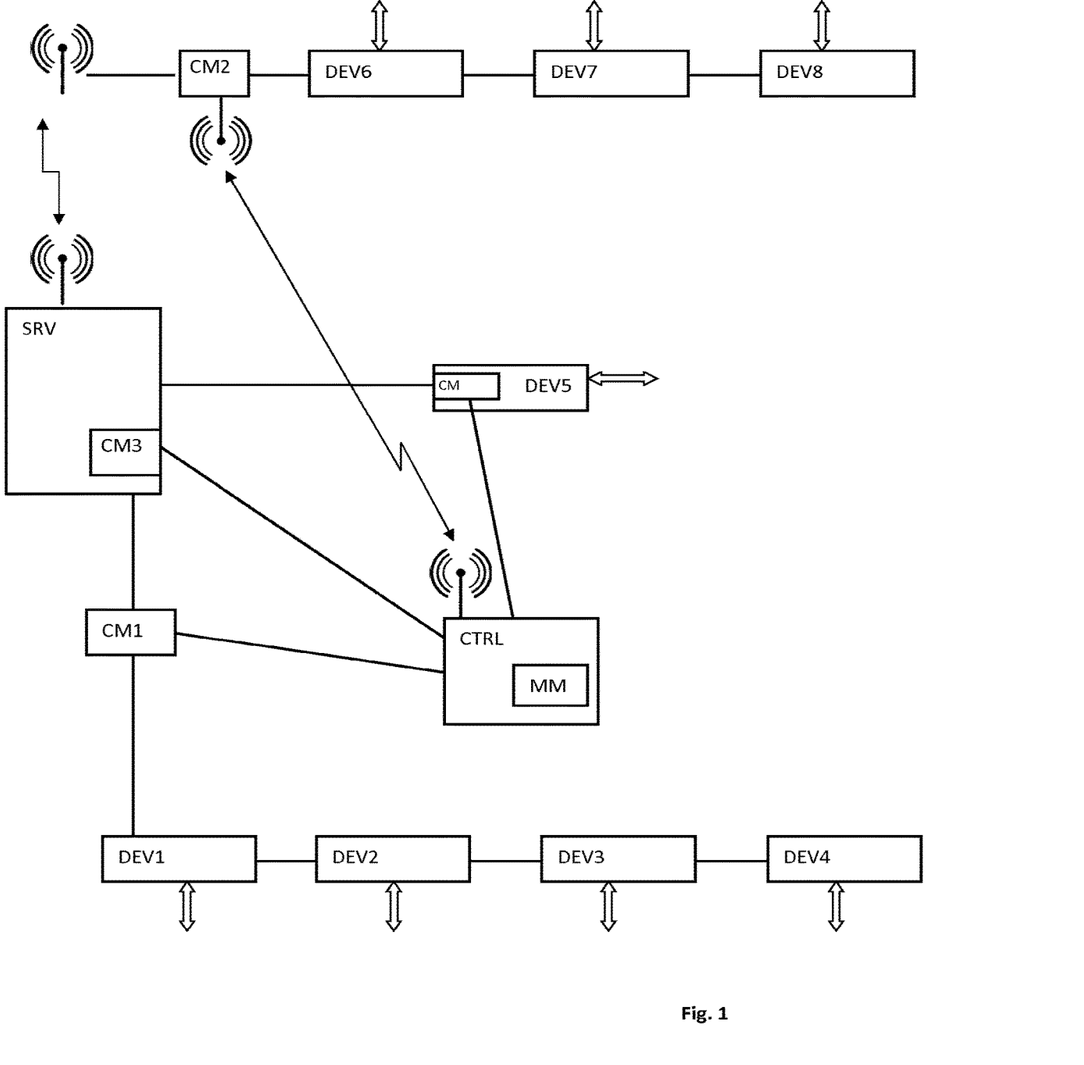
FIG. 1 illustrates the network and the various elements of the system.

In reference of the FIG. 1, a network comprises at least one server SRV and a plurality of devices DEV1 to DEV8. Connected to the network is a controller CTRL in charge of controlling the devices. The controller CTRL comprises a management module in charge of collecting time intervals and determining if a time interval is within a distribution of time intervals.

The FIG. 1 describes different embodiments which can be used alone or in combination.

The devices of the present disclosure could be sensors, captors, actuators, cameras or part of a machine to control the proper functioning of the machine. Each device has a device address used by the server to send a message to said device and to identify the response.

According to one embodiment, the devices are wired connected as illustrated by the devices DEV1 to DEV4. They could be also connected wirelessly as it is the case for the devices DEV6 to DEV8. In both cases the server can send messages to the devices and receive messages from the devices.

Communication Module

This module is in charge of analyzing the traffic on the network. This module can have several communication interfaces able to acquire messages from a variety of communication networks. A message detected by the communication module is analyzed and the recipient and/or the initiator are/is identified. When a message is addressed to a device, the communication module stores in its memory the current time and the identification of the recipient, i.e. the address of the recipient). When the communication module detects a response from this recipient by the analysis of the network's traffic, the communication module calculates the time interval between the time recorded at the sending and the current time while detecting the response. This time interval is sent to the management module MM of the controller CTRL with the identification of the device.

Figure 5:
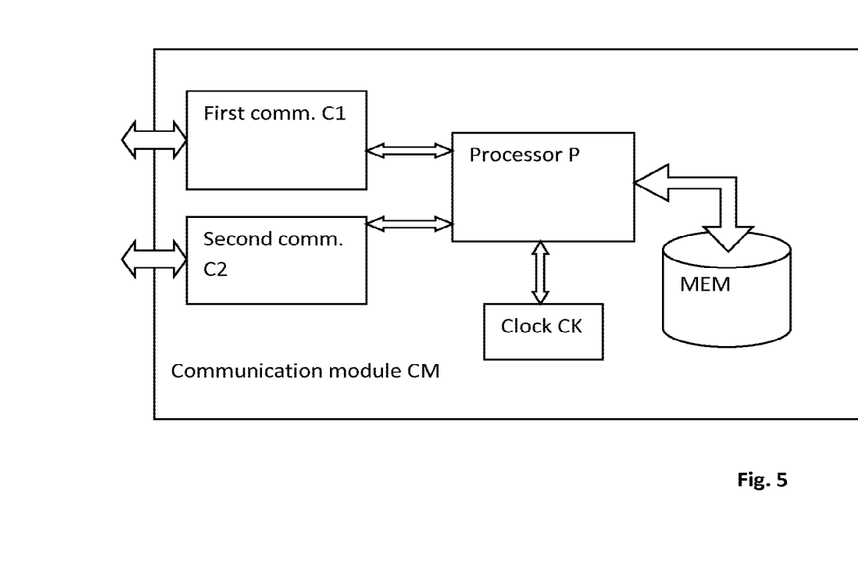
FIG. 5 illustrates one example of the communication module.

An example of a communication module is illustrated at the FIG. 5. In this example, the communication module CM comprises a first communication channel C1, connected to the network common to the target devices, and a second communication channel C2 with the management module MM.

It is to be noted that the same communication network can be used for collecting the messages to and from the devices and to communicate with the management module MM. The messages received through the first communication channel C1 are processed by a processor P of the communication module and the address of the recipient or the originator is extracted. The processor P has access to a memory MEM to store a record comprising at least the identification of the message, i.e. the target address and the current time. For that purpose, the communication module may comprise a clock module CK to provide the current time.

Figure 3:
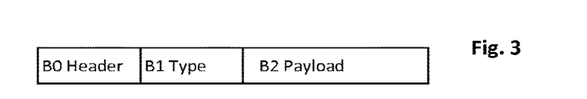
FIG. 3 illustrates the format of a message.

The format of a message is illustrated at the FIG. 3. It comprises at least a first section B0 which is the header comprising the recipient address and a second section B1 defining a message type. The instruction is interpreted by the device to carry out the requested task and a response is sent back to confirm the proper execution of the instruction. The message can further contain a data payload is section B2, for example if the server defines an action or set operating values. As an example, a device controlling a door could receive an instruction to modify the position of a selected door and the payload defines that the selected door should be opened at 20%.

According to a particular embodiment, the communication module comprises further information about the format of the messages. The messages sent and received from a device can have different types. When a message is analyzed, a message type is determined. The message type could be identified by the content of the message and describe the type of operation that the target device should perform, i.e. the instruction given to the device. This can be the request of a data, as a temperature for example, the initialization of the device, e.g. by setting the operating mode of the device, or a software download. Depending on the message type, the device will react differently to the instruction and the response time to this message can vary. In this embodiment, in the memory of the communication module, the sending time, the device address and the message type are stored. When the analysis of the traffic detects a response from the same device, the time interval is calculated and a record is sent to the management module comprising at least the device address and the time interval. It can further comprise the message type.

Some communication protocols implement, on the device side, two types of response. OSI is essentially a data communications management structure, which breaks data communications down into a manageable hierarchy of seven layers. Each layer has a defined purpose and interfaces with the layers above it and below it. By laying down standards for each layer, some flexibility is allowed so that the system designers can develop protocols for each layer independent of each other. By conforming to the OSI standards, a system is able to communicate with any other compliant system, anywhere in the world. The protocol comprises several layers, e.g. OSI Model). The first type of response can be generated at the transport layer and could be just an acknowledgment of the reception of the message sent by the server. At that time, the application layer of the target device has still not processed the message. In the frame of the present disclosure, the first type of acknowledgment will be named "transport response message" and the second type of response "application response message". The communication module, in an embodiment, may calculate the time interval from the interception of the "application response message" only and discard, while analysing the responses sent by a device, the "transport response message". The "application response message" is the one produced by the application layer of the device such as the metering temperature, control a circuit-breaker, a door etc. The header of the message contains the specification of the message type and in this particular case, from which layer it has been produced.

Management Module

This module MM is in charge of establishing a distribution of time intervals during an initialization phase. During this phase, the management module receives the records from the communication module, each record comprising at least the device address and the time interval. For a specific device, the management module stores all time intervals and calculates a distribution of time intervals. This distribution can be in the form of a minimum value and a maximal value, or a central value with deviations. The management module can add tolerances to take into account the variation of operating parameter of a device, such as the temperature, e.g. +/−10%.

The initialization phase can be defined manually by an operator defining when the initialization phase starts and when its ends. It can be also automatic and handled by the management module itself. Each time that a new device address is detected, the management module records a number of transactions, i.e. a record from the controller module, to determine the distribution of time intervals. This can be done by storing the first ten records or storing records during a first period, for example 24 hours.

It is to be noted that the management module can be in operational phase for some devices and in initialization phase for other devices, which could be the case for example for a new device in the environment.

In case that the communication module transmits also the message type, the distribution of time intervals is established per message type and per device. A plurality of distribution of time intervals can be associated with one device, each distribution of time intervals being associated with a message type.

According to a particular embodiment, the management module can retrieve a device type from the address of the device. For that purpose, the management module comprises a database in which the device addresses are listed with a device type. The network can connect several temperature sensors, each having a different address. However, they share the same device type.

As a particular embodiment, the distribution of time intervals is established per device type instead of per device. Each time a record is received from the communication module, the address is converted into a device type and the associated distribution of time intervals is used. In this case, several devices which have the same device type, can define the distribution of time intervals for said device type.

The operational phase of the management module is basically a comparison of the time interval received from the communication module with the distribution of time intervals. If the received time interval is outside the distribution of time intervals, an alarm is set. This alarm can be a message to a console, this message comprising the address of the device or is sent to another system for analysis.

In this embodiment, when a record is received from the communication module, the address is used to identify the distribution of time intervals to be used for the verification.

In case that a message type is added into the record, the device's address and the message type is used to retrieve the distribution of time intervals.

In case that the distribution of time intervals is defined in relation to a device type, the address is converted into device type using the internal database of the management module and the corresponding distribution of time intervals is retrieved for the comparison.

In another embodiment, the device type and the message type are used to retrieve the distribution of time intervals.

We have therefore the following cases wherein (DOTI stands for Distribution Of Time Intervals:
Device Address→DOTI
Device Address→Device Type→DOTI
Device Address and Message Type→DOTI
Device Address→Device Type and Message Type→DOTI According to one embodiment, a new device in the network having a known device type and therefore in which a distribution of time intervals is already stored according to this device type, can be immediately be under the surveillance of the management module without going through an initialization phase for said device.

According to one embodiment, the management module can generate a test message which will play the role of the first message. This test message is sent through the network during the learning phase or the surveillance phase. The management module can format a test message to a specific device, thus triggering the calculation of the time interval until the response is received. This test message can be a pre-recorded message, for example to test the presence of a device. This test message can be also one of the messages sent to the device by the server and recorded by the management module.

According to a particular embodiment, the management module may send a reboot message as test message to a device, said device responding to the reboot message once the reboot of the device is terminated.

Organization of the Various Modules

In the FIG. 1, several implementation modes are shown and can be used alone or in combination. According to a first implementation (not represented), the communication module and the management module are located in the server SRV. This server is the one controlling and exploiting the data from and to the devices. The server SRV is already a computer and a new software module comprising the two above mentioned modules is implemented. The communication module has then a natural connection with the traffic exchanged on the network and the management module receives internally the records from the communication module.

In a second embodiment, an independent controller CTRL comprises at least the management module receiving the time interval records from a remote communication module. The FIG. 1 illustrates several embodiments in which:
- the communication module CM3 is located in the server SRV and transmits the time interval record to the management module of the controller CTRL.
- the communication module CM is located directly into a device (e.g. device DEV5)
- the communication module CM1 is connected to the wired main network,
- the communication module CM2 is connected to a remote network and wirelessly connected to the controller CTRL.

According to the present disclosure, one or more communication modules, as described above, can intercept messages exchanged to the devices and send the time interval records to the controller.

Figure 2:
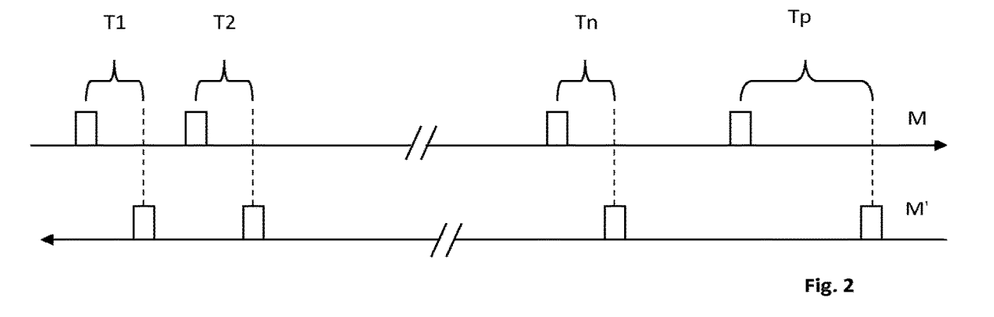
FIG. 2 illustrates the incoming and outgoing messages to a device.

The FIG. 2 illustrates the way the communication module works. A time T1 and a time T2 are the times between a first message or incoming message is sent to a first device on line M line M and a second message or outgoing message on-line M' corresponding to the response sent from the first device. The incoming message M is the message received by the first device and the outgoing message M' is a message sent by the first device in response to the incoming first message M. The times T1 and T2 are recorded during the initialization phase and allow the management module to calculate the distribution of time intervals. During the operational phase, the time Tn is the time interval between the reception of the first message by the first device and the sending of the response to the first message from the first device for the same device or a device of the same type as explained above. The time Tn is within the distribution of time intervals and the management module will not set an alarm for the device involved in these two messages.

In another example, a time Tp as shown in FIG. 2 is outside the distribution of time intervals. In this case, once the time interval Tp is received by the management module and the comparison determines that the time interval Tp is outside the distribution of time intervals, the alarm is set.

Figure 4:
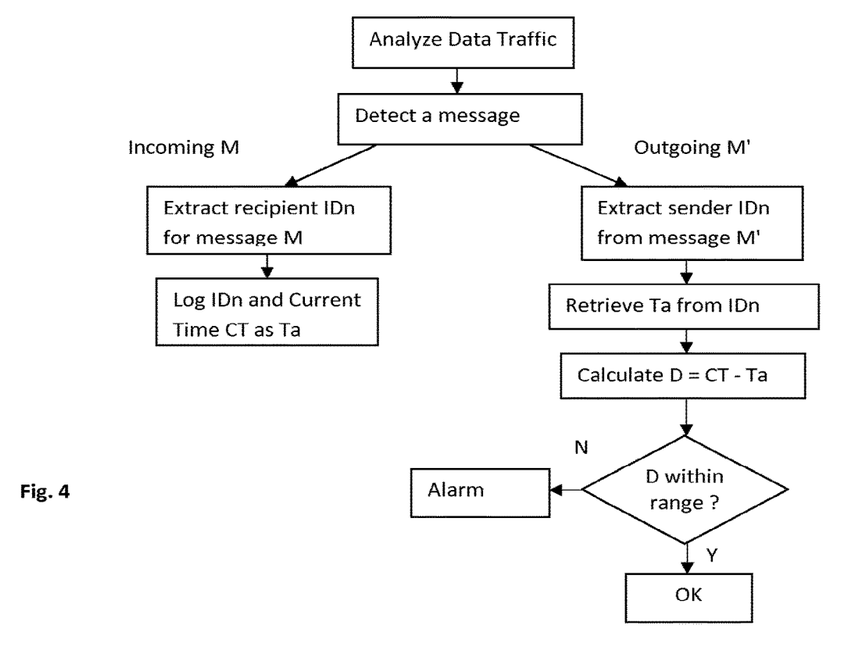
FIG. 4 illustrates the process for processing a message.

In FIG. 4, one example of the flowchart executed by the control module and the management module is illustrated. The control module receives the messages intercepted on a network and analyses them. The first test made by the communication module is to determine if the message is an incoming message M or an outgoing message M'. In order to discriminate the incoming and outgoing messages, the headers of the messages are analyzed. The communication module is able to extract from the messages at least the recipient address and/or the initiator address. According to one example, in a simple environment with one server communicating with several devices, the devices do not add the server address, while responding to the server. One device only inserts its address in the message in order to allow the server to identify the originator of the message. The header of the message comprises an indication that this message is a message intended to the server.

When the message is an incoming message M, the control module extracts the identification of the recipient IDn and stores said information IDn with the current time CT as a first time Ta, i.e. the time corresponding to the interception of the incoming message M. A record is stored in the memory of the control module with the identification of the recipient IDn and the first time Ta.

When an outgoing message is detected, the control module extracts from the message the identification of the sender IDn. The control module then retrieves in the memory the record corresponding to the identification of the sender IDn in order to retrieve the first time Ta.

With the current time CT (which corresponds to the time of the interception of the outgoing message M'), the control module calculates the time interval D between the current time and the first time Ta, i.e. D=CT−Ta. This time interval D is transferred to the management module with the identification of the device IDn for further analysis.

The management module, using the identification of the device, can retrieve the distribution of time intervals corresponding to said device. The management module then compares the received time interval D with the distribution of time intervals and determines if an alarm is set or not. Setting an alarm does not necessary mean that the device should be deactivated. We could have the case in which the device is temporarily busy with another task and the management module can comprise a filter to count the alarms for a given device. When a predetermined threshold of alarms is reached, a signal is sent to the console for further processing by an operator, or a message is transferred to a hierarchically higher system.

When the device does not reply after a predetermined time, the server can repeat the step of sending the message to the device. The control module will preferably store in its memory the current time of the last message and do not take into account, in the calculation of the time interval, the current time of the first attempt. This could be for example the case when a device is switched off or the network is interrupted. According to one particular embodiment, the control module stores with the identification IDn and the time Ta, a flag R meaning that no response was received from this specific device following the first attempt. This information can be part of the record sent to the management module for further analysis.

Example with SCADA

A Supervisory Control And Data Acquisition system or SCADA system refers to the combination of telemetry and data acquisition. SCADA encompasses the collecting of the information via a remote terminal unit RTU, transferring it back to a central site, carrying out any necessary analysis and control and then displaying that information on a number of operator screens or displays. The required control actions are then conveyed back to the process.

A SCADA system consists of a number of remote terminal units RTUs collecting field data and sending that data back to a master station via a communication system. The master station displays the acquired data and also allows the operator to perform remote control tasks. The accurate and timely data allows for optimization of a plant operation and process. A further benefit is to have more efficient, reliable and most importantly, safer operations.

This all results in a lower cost of operation compared to earlier non-automated systems. On a more complex SCADA system there are essentially five levels or hierarchies:

Field level instrumentation and control devices
Marshalling terminals and RTUs
Communications system
The master station(s)
The commercial information technology (IT) or data processing department computer system The RTU provides an interface to the field analog and digital sensors situated at each remote site.

The communications system provides the pathway for communications between the master station and the remote sites. This communication system can be wire, fiber optic, radio, telephone line, microwave and possibly even satellite. Specific protocols and error detection philosophies are used for efficient and optimum transfer of data.

The physical layer is the physical media over which the messages according to a protocol are transmitted. The physical layer specifies the electrical specifications, timing, pin-outs and so on. The data element at this level is essentially a bit, i.e. it is concerned with how to pass one bit of data at a time across the physical media. The definition of the physical layer also includes the functions for controlling the media, such as the details required to establish and maintain the physical link, and to control data flow.

The data link layer on the frame of a SCADA system is specified in a protocol named "DNP3". The purpose of the data link layer is to establish and maintain reliable communication of data over the physical link. Link establishment involves setting up the logical communications link between a sender and a receiver. The protocol DNP3 supports either connection oriented or connection-less operation. Thus, if a channel operates over a public switched telephone network line or PSTN line and requires connection by dialing before the communication can begin, the data link layer manages this without any direction from higher levels.

The data unit at the link layer level may be called the frame. The frame has a maximum size of 292 bytes including CRC codes, and carries a total of 250 bytes of information from the higher levels. The frame includes 16-bit source and destination addresses in its header. These provide for 65 536 different addresses. The address range FFF0-FFFF is reserved for broadcast messages, which are intended to be processed by all receivers. The addresses are logical in the sense that it is possible for one physical device to have more than one logical address. In such a case the different addresses would appear as separate devices to the master station.

The frame header also contains a function code. The functions supported by this are those required to initialize and test the operation of each logical link between a sender and a receiver. As an additional security feature every frame transmitted can request a confirmation of receipt. This is termed link layer confirmation.

Figure 6:
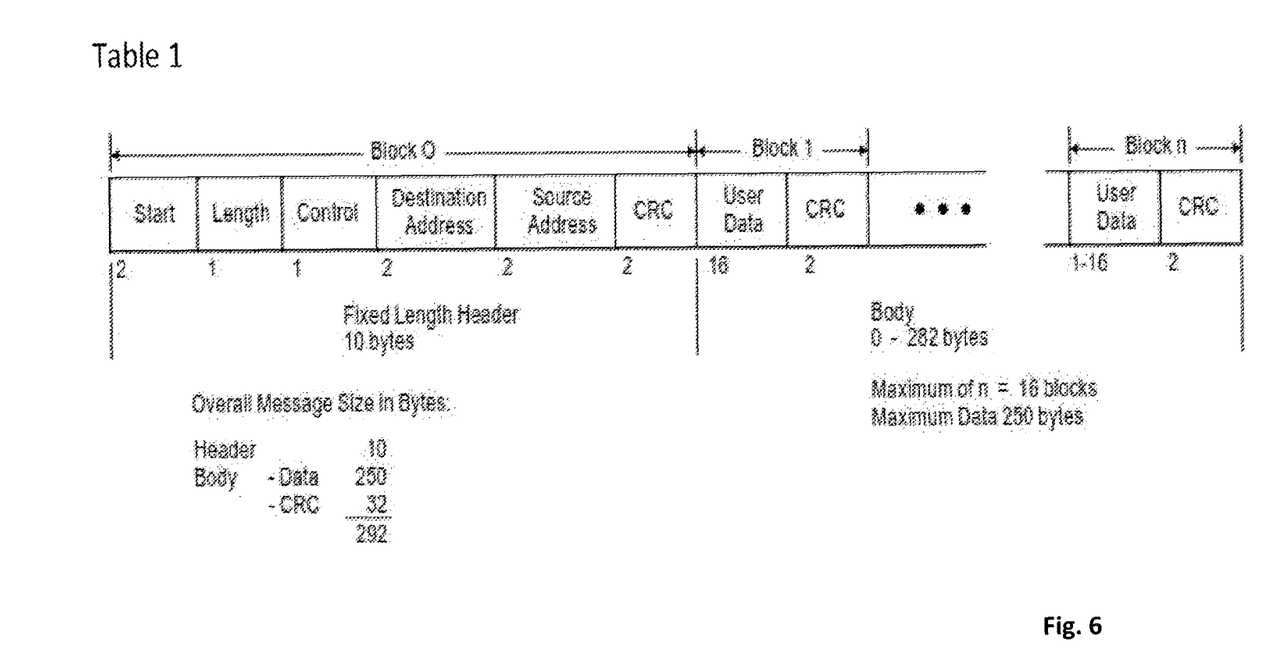
FIG. 6 illustrates Table 1.

One example of the frame format is based on a FT3 format frame as specified in IEC 870-5-1 standard. The format specifies a 10 byte header, followed optionally by up to 16 data blocks. The overall message size is limited to 292 bytes, which provides for a maximum data capacity of 250 bytes. Thus a fully packed frame will comprise the header plus 16 data blocks, with the last block containing 10 data bytes. See Table 1 in FIG. 6, where:

START: 2 bytes: 0564 (hex)
LENGTH: Count of user data in bytes, plus 5, not counting CRC bytes. This represents all data, excluding CRC codes following the LENGTH count byte. Its range is 0-255. This is convenient as it is the largest length count that may be represented by 1 byte (=FF hex).

CONTROL: Frame control byte. See below.

DESTINATION ADDRESS: 2 byte destination address (LSB, MSB)

SOURCE ADDRESS: 2 byte source address (LSB, MSB)

CRC: 2 byte cyclic redundancy check code

USER DATA: Each block has 16 bytes of user data. Last block has 1-16 as required. In case of a full frame the last block will have 10 bytes of user data.

Control Byte

The control byte follows the start and length bytes in the frame format. It provides for control of data flow over the physical link, identifies the type, and indicates the direction. The interpretation of most of the control byte is dependent on whether the communication is a primary or a secondary message. See Table 2 in FIG. 7.

Figure 7:
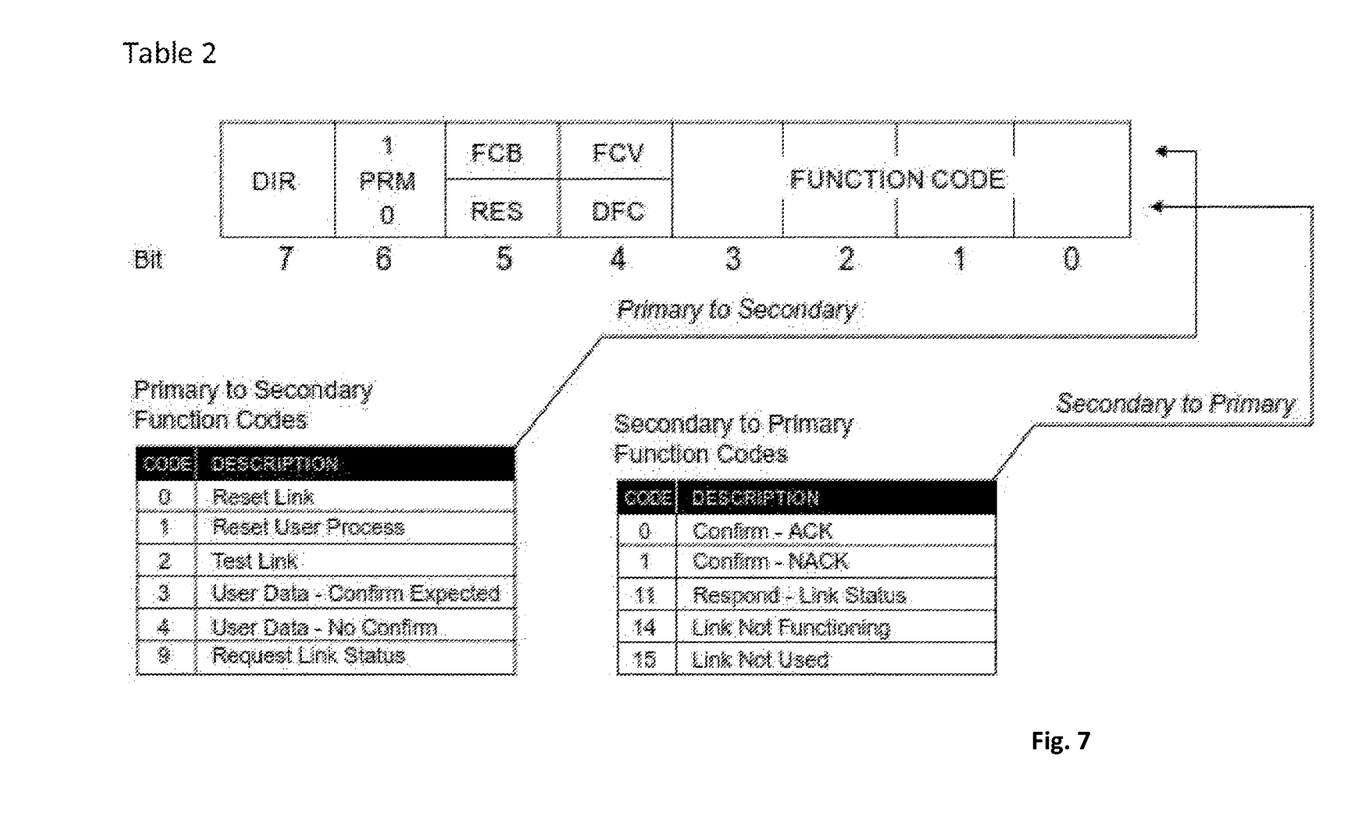
FIG. 7 illustrates Table 2.

In the frame of the present disclosure, the Destination Address and the Source Address are extracted from a message by the communication module in order to determine the time interval between the interception of two messages for a given device. Additionally, the Control Byte can be used to detect the type of messages and to apply a different distribution of time interval in function of the message type.

The management module could be part of a wider surveillance system, such as a Security information and event management or SIEM software products and services. Security information and event management SIEM software products and services combine security information management SIM and security event management SEM, and provide real-time analysis of security alerts generated by network hardware and applications. A SEM system centralizes the storage and interpretation of logs and allows near real-time analysis which enables security personnel to take defensive actions more quickly. A SIM system collects data into a central repository for trend analysis and provides automated reporting for compliance and centralized reporting. By bringing these two functions together, SIEM systems provide quicker identification, analysis and recovery of security events. They also allow compliance managers to confirm they are fulfilling an organization's legal compliance requirements. A SIEM product is available as software, appliances or managed services; these products are also used to log security data and generate reports for compliance purposes.

The functionalities of a SIEM may be as following:

Data aggregation: Log management aggregates data from many sources, including network, security, servers, databases, applications, providing the ability to consolidate monitored data to help avoid missing crucial events.

Correlation: looks for common attributes, and links events together into meaningful bundles. This technology provides the ability to perform a variety of correlation techniques to integrate different sources, in order to turn data into useful information. Correlation is typically a function of the Security Event Management portion of a full SIEM solution Alerting: the automated analysis of correlated events and production of alerts, to notify recipients of immediate issues. Alerting can be to a dashboard, or sent via third party channels such as email.

Dashboards: Tools can take event data and turn it into informational charts to assist in seeing patterns, or identifying activity that is not forming a standard pattern.

Compliance: Applications can be employed to automate the gathering of compliance data, producing reports that adapt to existing security, governance and auditing processes.

Retention: employing long-term storage of historical data to facilitate correlation of data over time, and to provide the retention necessary for compliance requirements. Long term log data retention is critical in forensic investigations as it is unlikely that discovery of a network breach will be at the time of the breach occurring.

Forensic analysis: The ability to search across logs on different nodes and time periods based on specific criteria. This mitigates having to aggregate log information in your head or having to search through thousands and thousands of logs.

Although embodiments of the present disclosure have been described with reference to specific example embodiments, different modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The illustrated embodiments are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A surveillance system connectable to a network, comprising:
   a communication module; and
   a management module;
   said system being configured to, during a first phase:
   a. intercept a first message from the network, said first message being sent to a first device;
   b. intercept a second message from the network, said second message being a response from the first device to the first message;
   c. calculate a time interval between the interception of the first message and the interception of the second message;

d. repeat the steps a. to c. to determine further time intervals;
e. determine a distribution of said time intervals;
f. store with reference to the first device, the distribution of the time intervals; and during a second phase, said system being configured to:
g. intercept a third message from the network, said message being sent to the first device;
h. intercept a fourth message from the network, said fourth message being a response from the first device to the third message;
i. calculate a new time interval between the interception of the third message and the interception of the fourth message; and
j. verify that the new time interval is within the distribution of time intervals,
wherein the messages are at least of two types, a transport layer message and an application layer message, and the system is further configured to calculate the time intervals only from the application layer messages, and
wherein the surveillance system is further configured to analyze the messages to further extract a message type, said distribution of time intervals being determined by message type, the message type being determined based on message content.

2. The surveillance system of claim 1, wherein the surveillance system is further configured to analyze messages on the network and to extract an addressing portion of each of the messages to determine to which devices the messages are addressed, or from which devices the messages originate.

3. The surveillance system claim 1, wherein the surveillance system is further configured to calculate the time interval between the interception of first and the interception of the second message, the management module being configured to determine the distribution of time intervals, and to verify that the new time interval is within the distribution of time intervals.

4. The surveillance system of claim 3, wherein the communication module is located in the first device, and the management module is located in a controller connected with the first device to receive the time intervals calculated by the communication module.

5. The surveillance system of claim 3, wherein the communication module further comprises an interface configured to communicate with a surveillance server, said server comprising the management module.

6. A method to supervise a network connected to a first device, said method comprising, during a first phase:
a. intercepting a first message from the network, said message being sent to a first device;
b. intercepting a second message form the network, said second message being a response from the first device to the first message;
c. calculating a time interval between the interception of the first message and the interception of the second message;
d. repeating the steps a to c in order to determine further time intervals;
e. determining a distribution of said time intervals;
e. storing, with reference to the first device, the distribution of time intervals;
and during a second phase, said method comprising:
f. intercepting a third message from the network, said message being sent to the first device;
g. intercepting a fourth message from the network, said fourth message being a response from the first device to the third message;
h. calculating a new time interval between the interception of the third message and the interception of the fourth message; and
i. verifying that the new time interval is within the distribution of time intervals,
wherein the first device generates messages of at least two types including a transport layer message and an application layer message, and the method further includes, determining the time intervals based only on the application layer messages, and
wherein the messages are analyzed to further extract a message type, said distribution of time intervals being determined by message type, the message type being determined based on message content.

7. The method of claim 6, further comprising:
analyzing messages on the network and extracting an addressing portion of each of the messages to determine to which devices the messages are addressed or from which devices the messages originate.

8. The method of claim 6, wherein the distribution of time intervals is organized by type of devices, said method comprises:
intercepting a fifth message from the network, said message being sent to a second device, said second device being of the same type of the first device;
intercepting a sixth message from the network, said sixth message being a response from the second device to the fifth message; and
calculating a new time interval between the interception of the fifth message and the interception of the sixth message;
wherein the verification is carried out with the device type distribution of time intervals.

* * * * *